United States Patent
Tahara (10) Patent No.: US 8,285,464 B2
(45) Date of Patent: Oct. 9, 2012

(54) HALF-CLUTCH STATE DECISION DEVICE

(75) Inventor: Tatsuya Tahara, Toyota (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 730 days.

(21) Appl. No.: 12/444,998

(22) PCT Filed: Apr. 24, 2008

(86) PCT No.: PCT/JP2008/057919
§ 371 (c)(1),
(2), (4) Date: Apr. 9, 2009

(87) PCT Pub. No.: WO2008/142949
PCT Pub. Date: Nov. 27, 2008

(65) Prior Publication Data
US 2010/0036573 A1    Feb. 11, 2010

(30) Foreign Application Priority Data

May 18, 2007 (JP) .................................. 2007-133158

(51) Int. Cl.
*G06F 7/00* (2006.01)
*G06F 17/00* (2006.01)
*G06F 19/00* (2011.01)
(52) U.S. Cl. .......................................... 701/68; 701/67
(58) Field of Classification Search .................... 701/67, 701/68
See application file for complete search history.

(56) References Cited

U.S. PATENT DOCUMENTS

| 5,379,634 A | 1/1995 | Kuroda et al. |
| 5,627,750 A * | 5/1997 | Kono et al. ............... 701/67 |
| 2004/0138024 A1 * | 7/2004 | Kano et al. ............... 477/74 |

FOREIGN PATENT DOCUMENTS

| JP | 05-107155 A | 4/1993 |
| JP | 05-180063 A | 7/1993 |
| JP | 05-180064 A | 7/1993 |
| JP | 05-312076 A | 11/1993 |
| JP | 2002-021617 A | 1/2002 |
| JP | 2002-188658 A | 7/2002 |
| JP | 2005-248909 A | 9/2005 |

* cited by examiner

*Primary Examiner* — Jeffrey Shapiro
(74) *Attorney, Agent, or Firm* — Sughrue Mion, PLLC (57) ABSTRACT

The half-clutch state decision device of the present invention extracts a high-frequency component and a low-frequency component of an engine rotation speed through filtering when the engine rotation speed has dropped while a vehicle is stopped, and calculates a locus length of the high-frequency component and a locus length of the low-frequency component through accumulation thereof. Furthermore, it is decided whether a half-clutch state exists from a relationship between the calculated locus lengths of the high-frequency and low-frequency components. Specifically, it uses a two-dimensional map (FIG. 5) having the locus length of the high-frequency component and the locus length of the low-frequency component as parameters and wherein a half-clutch decision region is set, plots the locus length of each component on that two-dimensional map, and decides whether a half-clutch state exists based on whether that plot point is inside the half-clutch decision region.

3 Claims, 7 Drawing Sheets

HALF-CLUTCH STATE DECISION DEVICE

TECHNICAL FIELD

The present invention relates to a half-clutch state decision device provided in a vehicle wherein a manual transmission connected to an output side of an engine (internal combustion engine) via a clutch is mounted and deciding a partial-engagement state of the clutch.

BACKGROUND ART

In order to obtain a required driving torque and vehicle speed in a vehicle wherein an engine is mounted, an engine output is subjected to a speed change and transferred to a drive wheel by a transmission. A transmission mounted in the vehicle can be an automatic transmission, automatically setting an optimum speed-change ratio between the engine and the drive wheel, or a manual transmission. In contrast to an automatic transmission, a manual transmission has better fuel efficiency, acceleration, and deceleration.

In a vehicle wherein a manual transmission is mounted, a clutch is provided between the engine and the manual transmission, and by engaging or disengaging that clutch in response to an operation of a clutch pedal, an output torque of the engine is transferred to, or cut-off from, the manual transmission (for example, see Patent Document 1).

Meanwhile, port injection type engines and in-cylinder direct injection type engines are known as engines mounted in vehicles, etc. In a port injection type engine, a uniform air-fuel mixture is formed by injecting a fuel such as gasoline, etc. into an air intake path from a fuel injection valve (injector) provided in an air intake port, and the air-fuel mixture is introduced into a combustion chamber and ignited using a spark plug.

In an in-cylinder direct injection type engine, a fuel injection valve is provided in each cylinder, an air-fuel mixture is formed by injecting a fuel such as gasoline, etc. from that fuel injection valve directly into a combustion chamber and mixing with intake air introduced into the combustion chamber from an air intake port, and the air-fuel mixture is ignited using a spark plug. The in-cylinder direct injection type engine is superior in terms of low fuel consumption, low exhaust-gas emissions, and high output, etc., and therefore, demand is increasing rapidly.

Furthermore, in an engine mounted in a vehicle, an electronic throttle system comprising an actuator (throttle motor) driving a throttle valve provided in the air intake path and making it possible to control a throttle opening degree independent of an accelerator-pedal operation of a driver is known.

With the electronic throttle system, the throttle opening degree is controlled so as to acquire an optimum intake air volume (target air-intake volume) in accordance with driving states of the engine such as an engine rotation speed and a degree of accelerator-pedal depression of the driver (accelerator opening degree), etc. In specific terms, an actual throttle-opening degree of the throttle valve is detected using a throttle-opening degree sensor, etc., and an actuator of the throttle valve is subjected to feedback control such that that actual throttle-opening degree matches the throttle-opening degree (target throttle-opening degree) at which the above-mentioned target air-intake volume is acquired (for example, see Patent Document 2).

Patent Document 1: JP 2002-188658 A
Patent Document 2: JP 2002-021617 A
Patent Document 3: JP 2005-248909 A

DISCLOSURE OF INVENTION

Problem to be Solved by the Invention

In an engine, catalyst warm-up control bringing about a retardation of ignition timing is performed during fast idling immediately after a cold startup with the aim of quickly activating a catalyst. With catalyst warm-up control, torque is reduced by delaying the ignition timing in order to increase an intake air volume. However, in a case wherein an engine rotation speed drops lower than expected during catalyst warm-up control, the catalyst warm-up control must be terminated in order that that rotation speed can be allowed to recover.

However, in a case wherein the engine rotation speed drops while the vehicle is in a stopped (vehicle speed=0 km/h) state immediately after a cold startup, it is not possible to determine whether that engine rotation speed drop is occurring as a result of a half-clutch operation or of an engine abnormality (combustion deterioration such a misfire, etc.).

When, in this way, it is not possible to determine whether a half-clutch operation or an engine abnormality (combustion deterioration) is the cause of an engine rotation speed drop while the vehicle is stopped, an engine abnormality may be incorrectly detected, regardless of a half-clutch state existing, or an engine abnormality may not be detected when actually occurring. Furthermore, if it can be decided that an engine rotation speed drop occurring during fast idling is being caused by a half-clutch state, it becomes possible to restart control for warming-up the catalyst after release of the half-clutch state.

Although a half-clutch state can be decided if a stroke sensor detecting a stroke of the clutch pedal is provided, incorrect detection of clutch partial engagement may occur in such a case so far as an error detection system detecting an error in the stroke sensor itself is not configured, and incorrect detection of an engine abnormality as explained above or an inability to detect engine abnormalities may occur.

The present invention was achieved in consideration of the above circumstances and takes as its object the provision, in a vehicle wherein a manual transmission connected to an output side of an engine via a clutch is mounted, of a half-clutch state decision device capable of deciding a partial-engagement state of the clutch when the vehicle is stopped.

Member Solving Problem

The half-clutch state decision device of the present invention is provided in a vehicle wherein a manual transmission is connected to an output side of an engine via a clutch and decides a partial-engagement state of the clutch. This type of half-clutch state decision device is provided with an engine rotation-speed detection member detecting a rotation speed of the engine, a stop detection member detecting stopping of the vehicle, a frequency extraction member extracting a high-frequency component and a low-frequency component of the engine rotation speed through a filtering process when the engine rotation speed has dropped while the vehicle is stopped, and a locus length calculation member calculating a locus length of the high-frequency component and a locus length of the low-frequency component through accumulation of each of the high-frequency component and the low-frequency component, and has a decision member deciding whether or not the clutch is in a half-clutch state from a relationship between the locus length of the high-frequency component and the locus length of the low-frequency component calculated by the locus length calculation member.

In the above-explained configuration, the decision member can be configured so as to use a map having the locus length of the high-frequency component and the locus length of the low-frequency component as parameters and wherein a half-clutch decision region is set with a relationship between that locus length of the high-frequency component and that locus length of the low-frequency component taken into consideration and to determine whether or not a half-clutch state exists by referring to the map based on a locus length of the high-frequency component and a locus length of the low-frequency component calculated by the locus length calculation member.

Furthermore, the decision member can be configured so as to calculate a locus length ratio [locus length of high-frequency component/locus length of low-frequency component] of the locus length of the high-frequency component and the locus length of the low-frequency component calculated by the locus length calculation member and determine whether or not a half-clutch state exists by comparing that locus length ratio with a prescribed decision value.

An action of the present invention is explained hereinafter.

First of all, when fast idling is being performed, the engine rotation speed contains a high-frequency component (a component proportional to engine ignition) and a low-frequency component, and the high-frequency component becomes stronger when a combustion state of the engine deteriorates. As a result of performing a filtering process (in specific terms, a filtering process using an LPF (low pass filter)) on the engine rotation speed, the high-frequency component is obtained by extracting an explosion primary component of a rotation and the low-frequency component is obtained by extracting a component corresponding to a period of a clutch pedal operation by a driver, and a degree of deterioration of the combustion state of the engine can be known from that extracted high-frequency component.

In specific terms, the degree of deterioration of the combustion state can be detected from a length of a locus length obtained through accumulation (line integration) of the high-frequency component, and when the locus length of that high-frequency component is short, it can be decided that the engine is normal. In other words, in a case wherein the locus length of the high-frequency component is short when a drop in the engine rotation speed has occurred while the vehicle is stopped, it can be decided that that drop in the engine rotation speed was caused by a half-clutch operation.

However, a low-frequency component (frequency component of a clutch pedal operation, etc.) is contained in the high-frequency component extracted through the filtering process of the engine rotation speed, and therefore, in order to reduce an effect of that low-frequency component, it is necessary to perform half-clutch decision with a relationship between the high-frequency and the low-frequency component taken into consideration. A specific method thereof is explained.

Figure 5:
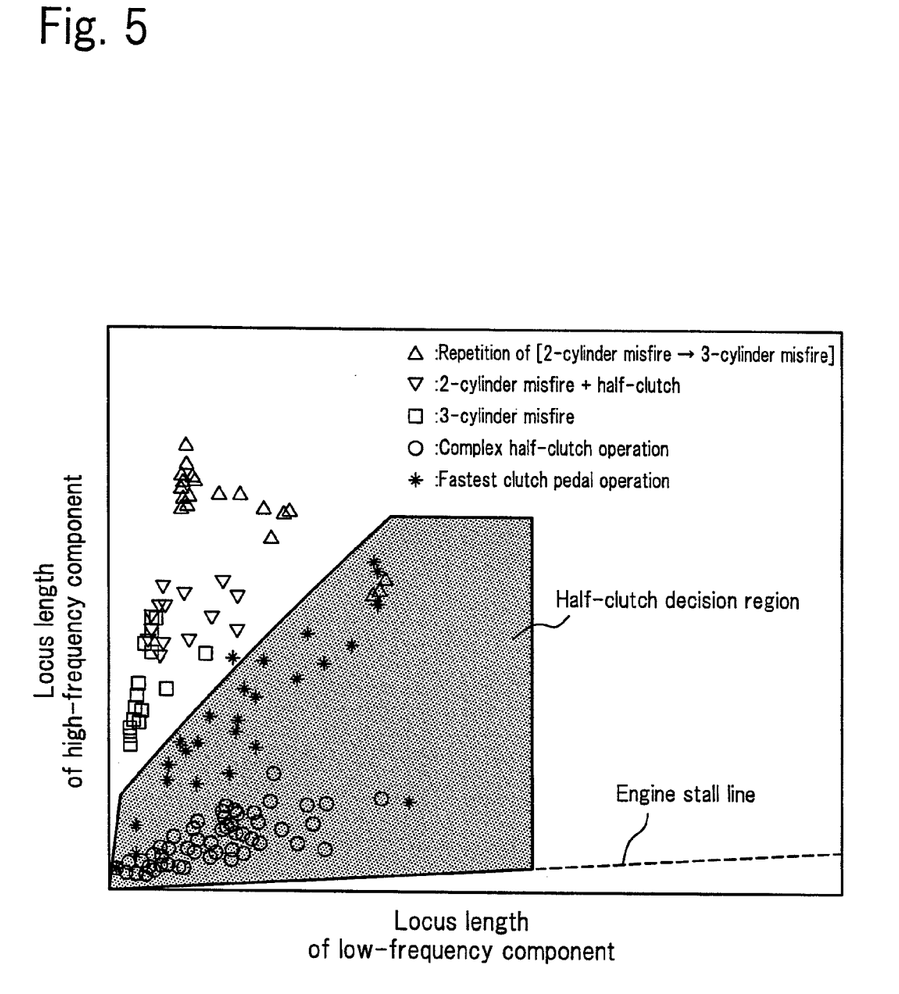
FIG. 5 is a diagram showing a half-clutch decision map.

First of all, the locus length of the high-frequency component and the locus length of the low-frequency component of the engine rotation speed are obtained in advance through testing, etc., this locus length of the high-frequency component and locus length of the low-frequency component are plotted on a graph as shown in FIG. 5, or in other words, a graph with the locus length of the low-frequency component as the horizontal axis and the locus length of the high-frequency component as the vertical axis, and a half-clutch decision map is created by determining a half-clutch decision region with each plotted data set and an engine stall line taken into consideration.

Next, a high-frequency component and a low-frequency component are extracted from the engine rotation speed by a filtering process, the locus length of the high-frequency component and locus length of the low-frequency component are calculated by accumulation (line integration) of this high-frequency component and this low-frequency component, that calculated locus length of the high-frequency component and locus length of the low-frequency component are plotted on the above-explained half-clutch decision map, and when a drop in the engine rotation speed occurs, it can be decided whether or not a half-clutch state exists based on whether or not that plotted point is inside the half-clutch decision region.

By performing half-clutch decision by plotting the locus length of the high-frequency component on a two dimensional map with the locus length of the low-frequency component as the horizontal axis and the locus length of the high-frequency component as the vertical axis in this way, it is possible to reduce an effect of the low-frequency component contained in the high-frequency component extracted from the engine rotation speed.

Similarly, furthermore, by calculating the locus length of the high-frequency component and the locus length of the low-frequency component of the engine rotation speed and calculating a locus length ratio [locus length of high-frequency component/locus length of low-frequency component] of the locus length of the high frequency component and the locus length of the low frequency component, it is possible to reduce an effect of the low-frequency component contained in the extracted high-frequency component. In this case, the locus length ratio [locus length of high-frequency component/locus length of low-frequency component] is compared with a prescribed decision value, and a half-clutch state is decided to exist when the locus length ratio is less than or equal to the decision value [locus length of high-frequency component/locus length of low-frequency component≦decision value].

EFFECT OF THE INVENTION

In accordance with the present invention, in a vehicle wherein a manual transmission connected to an output side of an engine via a clutch is provided, a half-clutch state can be decided from a relationship between the locus length of the high frequency component and the locus length of the low frequency component of the engine rotation speed, and therefore, it is possible to determine a half-clutch state while a vehicle is stopped without using a stroke sensor detecting a stroke of the clutch pedal, etc.

DESCRIPTION OF REFERENCE NUMERALS

1: Engine
2: Injector
3: Spark plug
5: Throttle valve
6: Throttle motor
22: Airflow meter
26: Engine rotation speed sensor
100: ECU
200: Manual transmission
300: Clutch

BEST MODE FOR CARRYING OUT THE INVENTION

The following is a description of embodiments of the present invention, with reference to the drawings.

Figure 1:
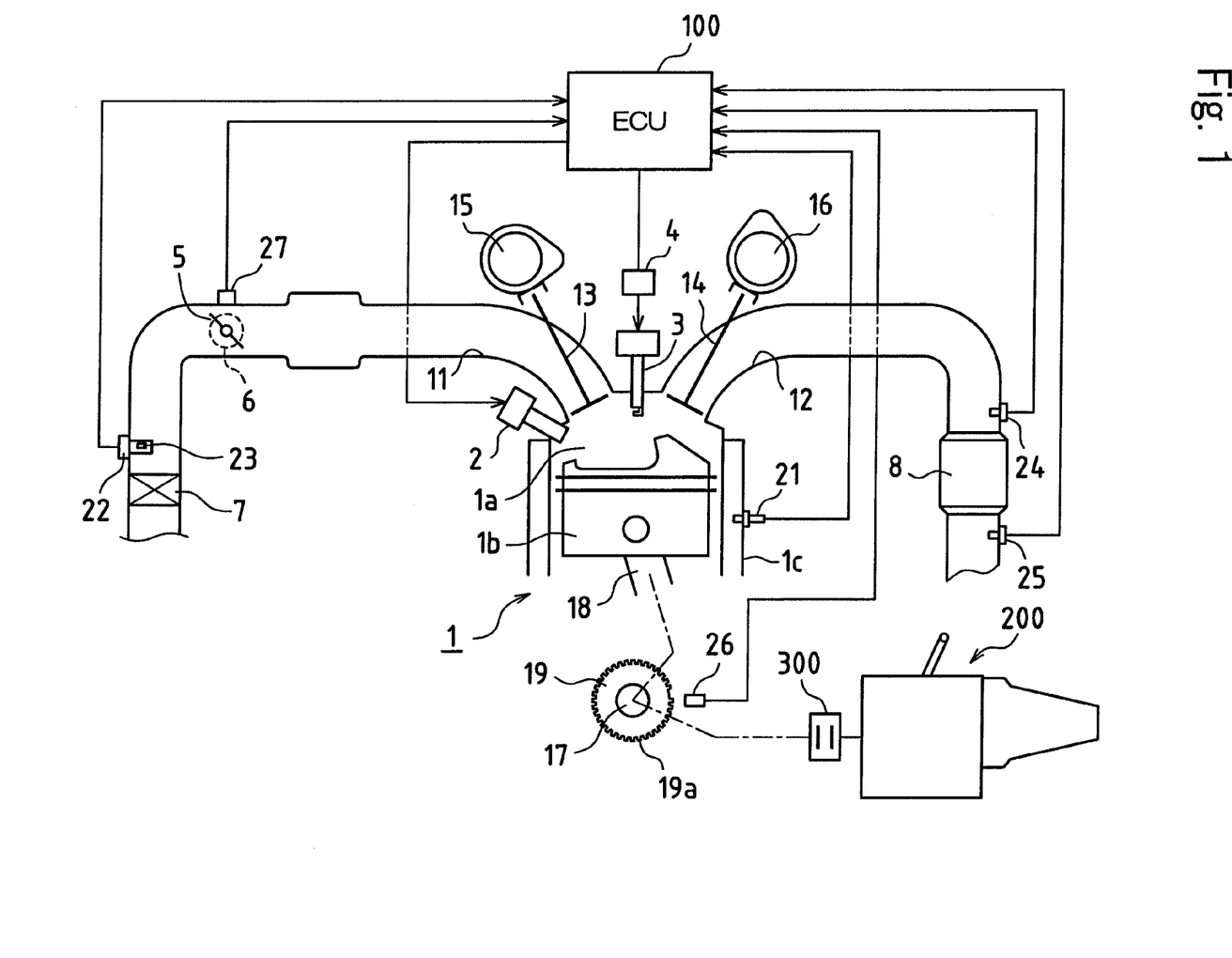
FIG. 1 is a schematic configuration diagram showing an example of a vehicle whereto the present invention is applied.

FIG. 1 is a diagram showing a schematic configuration showing an example of a vehicle whereto the present invention is applied. It should be noted that only a configuration of one cylinder of an engine 1 is shown in FIG. 1.

The engine (internal combustion engine) 1, a manual transmission 200, a clutch 3 and an ECU (electronic control unit) 100, etc. are provided in the vehicle of this example, and the half-clutch state decision device of the present invention is realized using a program executed by that ECU 100.
<Engine>

The engine 1 is, for example, an in-cylinder direct injection type, four-cylinder engine and comprises a piston 1b partitioning and forming a combustion chamber 1a and a crankshaft 17 constituting an output shaft. The piston 1b is connected to the crankshaft 17 via a connecting rod 18, and a reciprocal motion of the piston 1b is converted into a rotation of the crankshaft 17 by a connecting rod 18.

The crankshaft 17 of the engine 1 can be connected to a manual transmission 200 via a clutch 300, and motive energy from the engine 1 can be transferred via the manual transmission 200 to a drive wheel (not shown in the figure). The clutch 300 is, for example, a dry-plate type friction clutch, and as a result of the clutch 300 adopting a disengaged state, the transfer of motive energy from the engine 1 to the manual transmission 200 is cut off. Furthermore, as a result of the clutch 300 adopting an engaged state, motive energy can be transferred from the engine 1 to the manual transmission 200.

A signal rotor 19 having a plurality of protrusions (teeth) 19a on an exterior peripheral surface is mounted on the crankshaft 17. An engine rotation speed sensor 26 is provided in the vicinity of the signal rotor 19 at a side thereof. The engine rotation speed sensor 26 is, for example, an electromagnetic pickup, and upon rotation of the crankshaft 17, generates a pulse-shaped signal (output pulse) corresponding to a protrusion 19a of the signal rotor 19.

A water temperature sensor 21 detecting a cooling water temperature of the engine 1 is provided on a cylinder block 1c of the engine 1. A spark plug 3 is provided in a combustion chamber 1a of the engine 1. An ignition timing of the spark plug 3 is adjusted by an igniter 4. The igniter 4 is controlled by the ECU 100.

An air intake path 11 and an air discharge path 12 are connected to the combustion chamber 1a of the engine 1. An air intake valve 13 is provided between the air intake path 11 and the combustion chamber 1a, and by driving opening and closing of this air intake valve 13, the air intake path 11 and the combustion chamber 1a are allowed to communicate or are cut off. Furthermore, an air discharge valve 14 is provided between the air discharge path 12 and the combustion chamber 1a, and by driving opening and closing of this air discharge valve 14, the air discharge path 12 and the combustion chamber 1a are allowed to communicate or are cut off. Driving of the opening and closing of this air intake valve 13 and this air discharge valve 14 is performed by rotation of an air intake camshaft 15 and an air discharge camshaft 16, respectively, whereto the rotation of the crankshaft 17 is transferred.

An air cleaner 7, a hot-wire type airflow meter 22, an intake air temperature sensor 23 (within the airflow meter 22), and an electronic-control type throttle valve 5 adjusting an intake air volume of the engine 1 are provided in the air intake path 11. The throttle valve 5 is driven by a throttle motor 6. An opening degree of the throttle valve 5 is detected by a throttle opening degree sensor 27.

A three-way catalyst 8 is provided in the air discharge path 12 of the engine 1. An air-fuel ratio sensor 24 is provided in the air discharge path 12 at an upstream side of the three-way catalyst 8. The air-fuel ratio sensor 24 is a sensor demonstrating a linear characteristic with respect to air-fuel ratios. Furthermore, an oxygen sensor 25 is provided in the air discharge path 12 at a downstream side of the three-way catalyst 8. The oxygen sensor 25 demonstrates a so-called Z-characteristic with an output value thereof changing with a step shape in the vicinity of a theoretical air-flow ratio.

Furthermore, the engine 1 is provided with an injector (fuel injection valve) 2 in each cylinder for direct injection of fuel into the combustion chamber 1a. A high-pressure fuel is supplied to the injector 2 of each cylinder by a fuel supply apparatus, an air-fuel mixture wherein air and fuel are mixed is formed within the combustion chamber 1a as a result of direct injection of fuel from each of those injectors 2 into the combustion chamber 1a, and that air-fuel mixture is burned in the combustion chamber 1a pursuant to ignition of the spark plug 3. As a result of burning of this air-fuel mixture in the combustion chamber 1a, the piston 1b performs reciprocal motion and the crankshaft 17 rotates. The above-described driving state of the engine 1 is controlled by the ECU 100.
<ECU>

Figure 2:
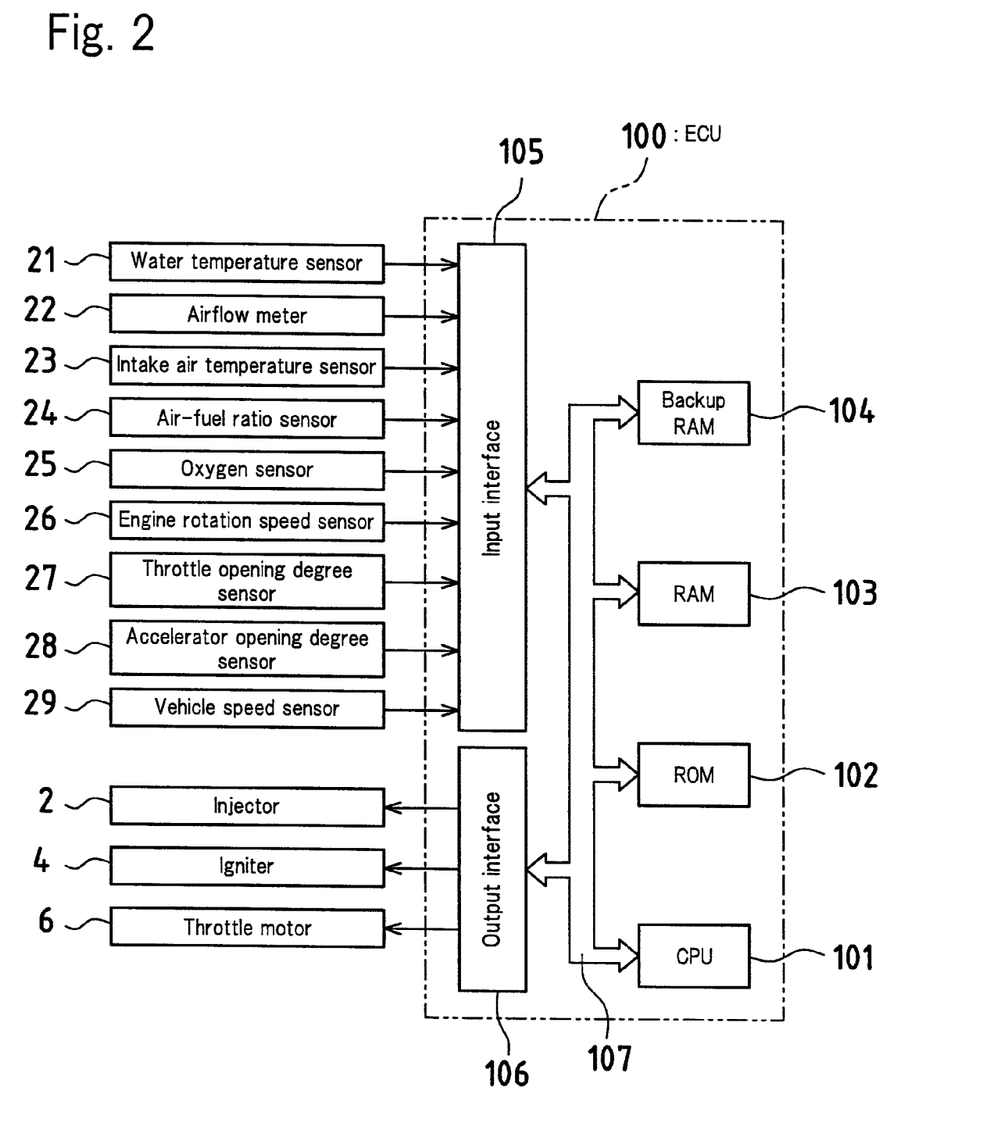
FIG. 2 is a block diagram showing a configuration of a control system of an ECU, etc.

As shown in FIG. 2, the ECU 100 comprises a CPU 101, a ROM 102, a RAM 103, a backup RAM 104, and a counter used during locus length accumulation as described hereinafter, etc.

Various types of control programs and maps, etc. referenced upon execution of those various types of control programs are stored in the ROM 102. The CPU 101 performs arithmetic processing based on the various types of control programs and maps stored in the ROM 102. The RAM 103 has memory for temporarily storing results of arithmetic operations within the CPU 101 and data input from sensors, etc., and the back-up RAM 104 has non-volatile memory for storing data of the engine 1 to be stored upon stopping thereof, etc.

This CPU 101, ROM 102, RAM 103, and back-up RAM 104 are mutually connected via a bus 107, and in addition, are connected to an input interface 105 and an output interface 106.

Various sensors such as a water temperature sensor 21, an airflow meter 22, an intake air temperature sensor 23, an air-fuel ratio sensor 24, an oxygen sensor 25, an engine rotation speed sensor 26, a throttle opening degree sensor 27, an accelerator opening degree sensor 28 outputting a detection signal in response to a degree of by-foot depression of an accelerator pedal, and a vehicle speed sensor 29, etc. are connected to the input interface 105. The injector 2, the igniter 4 of the spark plug 3, and the throttle motor 6 of the throttle valve 5, etc. are connected to the output interface 106.

Furthermore, the ECU 100 executes various controls of the engine 1 including an injection timing control of the injector 2 and an ignition timing control of the spark plug 3, etc. based on a detection signal of the above-described various sensors. In addition, the ECU 100 executes an "idling rotation speed control" and a "half-clutch decision process", explained hereinafter.

<Idling Rotation Speed Control>

The idling rotation speed control is a control executed during idling of the engine 1 and performs feedback control of a volume of air intake to the engine 1 by adjusting an opening degree of the throttle valve 5 such that an actual idling rotation speed during idling matches a target idling rotation speed.

In specific terms, it calculates the target idling rotation speed by referring to a map, etc. based on a driving state of the engine 1 and also reads an actual idling rotation speed (engine rotation speed) from an output signal of the engine rotation speed sensor 26, and in order that that actual idling rotation speed matches the target idling rotation speed, it performs feedback control of the volume of air intake to the engine 1 by controlling the opening degree of the throttle valve 5.

Furthermore, the ECU 100 also executes fast idling in certain cases. Fast idling is a control setting the idling rotation speed higher (for example, 1,220 rpm) than normal (when warm) in, for example, a case (when cold) wherein the cooling water temperature of the engine 1 is lower than a predecided temperature.

Furthermore, with the aim of quick activation of the three-way catalyst 8, the ECU 100 performs a retard angle control in order to warm-up the catalyst in certain cases during fast idling.

With retard angle control with the aim of warming up the catalyst, as explained above, torque is lowered by delaying the ignition timing in order to increase the intake air volume, and therefore, it is difficult to maintain torque sufficient to withstand friction when the clutch 300 is in a half-clutch state. In consideration of this point, retard angle control with the aim of warming up the catalyst is terminated in this example in a case wherein it is decided using a half-clutch decision process explained hereinafter that the clutch 300 is in a half-clutch state when an engine rotation-speed drop has occurred.

<Half-Clutch Decision Process>

First of all, a map used in the half-clutch decision process is explained.

A half-clutch decision map used in this example is created based on data obtained in advance through testing. A creation procedure thereof is shown below.

(1) Test states (see FIG. 5)
(a) Repetition of [2-cylinder misfire→3-cylinder misfire]
(b) 2-cylinder misfire+half-clutch
(c) 3-cylinder misfire
(d) Complex half-clutch operation
(e) Fastest clutch pedal operation (2) Testing was carried out at the above states (a) to (e), and a locus length of a high frequency component and a locus length of a low frequency component of the engine rotation speed Ne were obtained.

Figure 3:
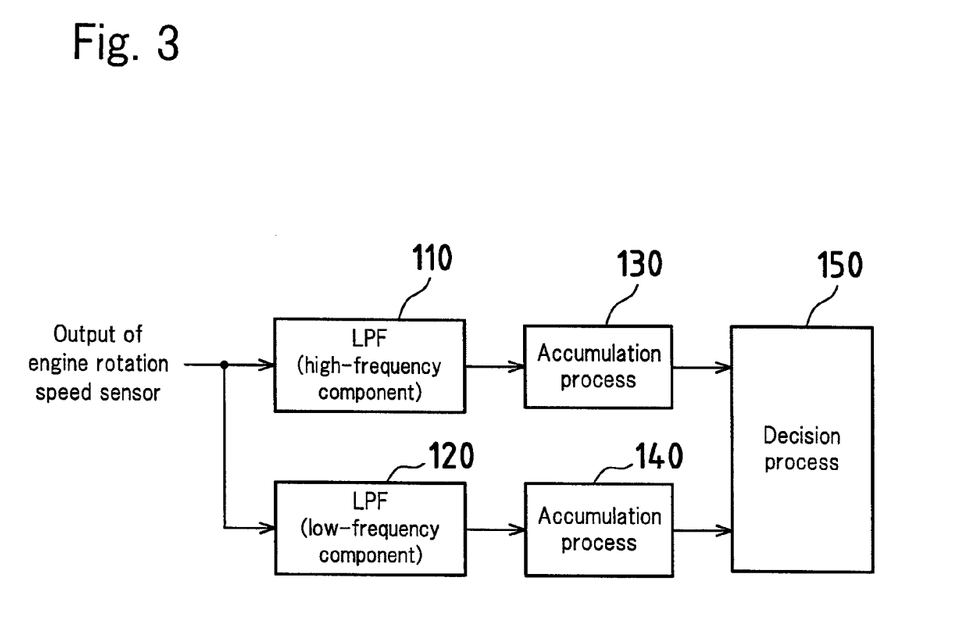
FIG. 3 is a control block diagram showing an example of a half-clutch decision process executed in the ECU.

In specific terms, as shown in FIG. 3, a high-frequency component enesmh of the engine rotation speed Ne was extracted by carrying out a filtering process on an output signal of the engine rotation speed sensor 26 using an LPF 110, and the locus length of the high-frequency component was calculated through accumulation (line integration) of that high-frequency component enesmh. The following formula was used for accumulation of the locus length of the high-frequency component.

Locus length of high-frequency component=Previous locus length+|enesmh−Previous enesmh|

Here, a data sampling frequency was set at 16 ms and an accumulation interval was set at 1 sec. A cutoff frequency of the LPF 110 was set to 61 Hz (equivalent to explosion primary component for fast idling rotation speed=1,220 rpm).

Furthermore, in the same way, a low-frequency component enesml of the engine rotation speed Ne was extracted by carrying out a filtering process on an output signal of the engine rotation speed sensor 26 using an LPF 120, and the locus length of the low-frequency component was calculated through accumulation (line integration) of that low-frequency component enesml. The following formula was used for accumulation of the locus length of the low-frequency component.

Locus length of low-frequency component=Previous locus length+|enesml−Previous enesml|

Here, a data sampling frequency was set at 16 ms and an accumulation interval was set at 1 sec. Furthermore, a cutoff frequency of the LPF 120 was set to 2 Hz (equivalent to a low-frequency component of a clutch pedal operation).

(3) As shown in FIG. 5, the locus length of the high-frequency component and the locus length of the low-frequency component calculated by a process of (2) were plotted on a graph with the locus length of the low-frequency component as the horizontal axis and the locus length of the high-frequency component as the vertical axis, a half-clutch decision region was determined with a distribution of that plotted data set and an engine stall line taken into consideration, and the half-clutch decision map was created. The half-clutch decision map shown in this FIG. 5 is stored in the ROM 102 of the ECU 100.

Figure 4:
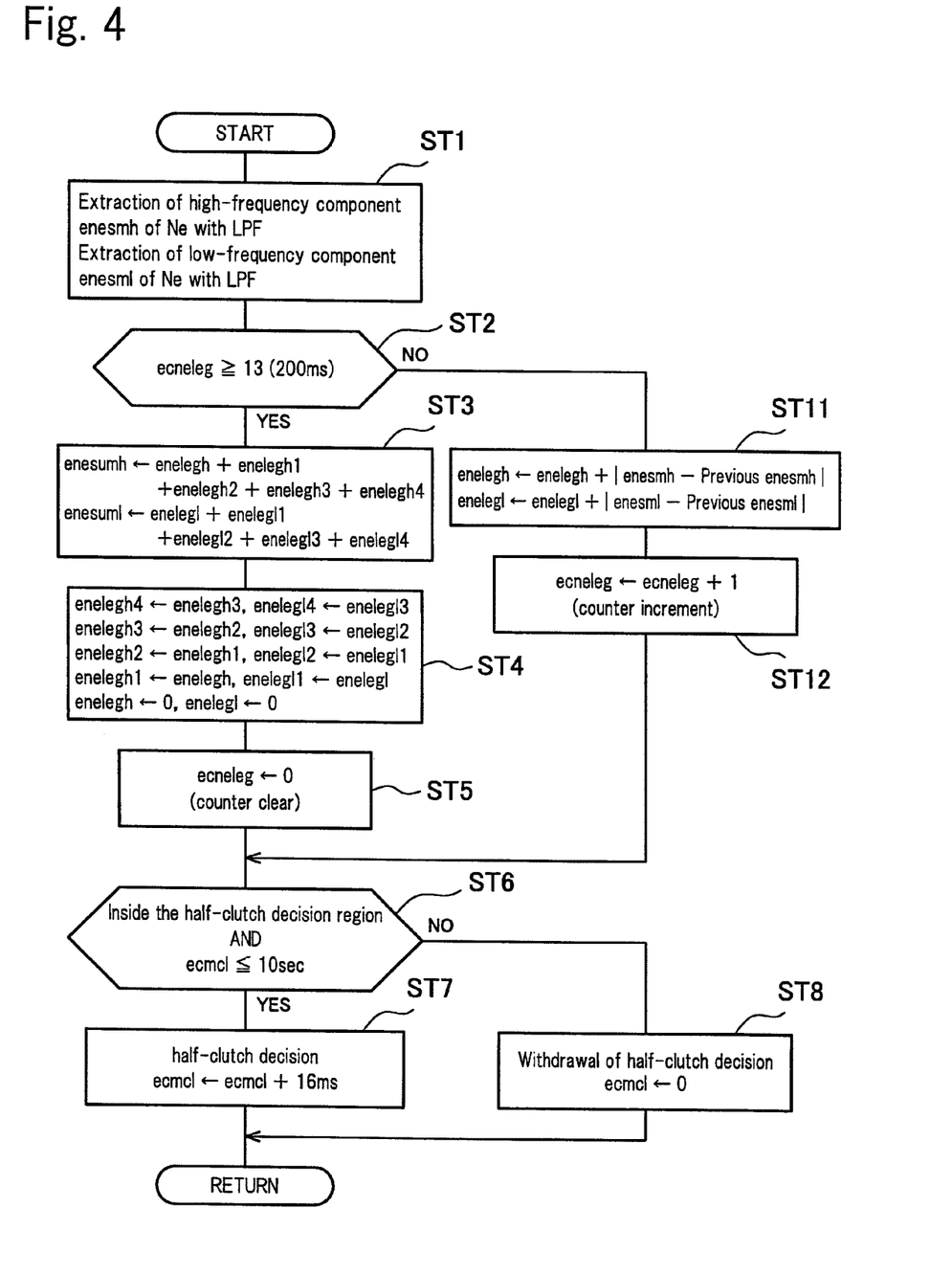
FIG. 4 is a flowchart showing an example of a control routine of the half-clutch decision process executed in the ECU.

Next, a specific example of a half-clutch decision process is explained by way of reference to FIG. 3 and FIG. 4. A control routine of the half-clutch decision process of FIG. 4 is executed repeatedly in the ECU 100 at a prescribed interval (16 ms).

The control routine of the half-clutch decision process of this example starts when a prescribed state is satisfied, or in other words, when a drop in the engine rotation speed Ne occurs while the vehicle is stopped (vehicle speed is 0 km/h based on the output signal of the vehicle speed sensor 29).

In step ST1, the high-frequency component enesmh and the low-frequency component enesml of the engine rotation speed Ne are extracted.

In specific terms, as shown in FIG. 3, a high-frequency component enesmh of the engine rotation speed Ne is extracted by carrying out a filtering process on an output signal of the engine rotation speed sensor 26 using an LPF 110 (cutoff frequency: 61 Hz). In addition, a low-frequency component enesml of the engine rotation speed Ne is extracted by carrying out a filtering process on an output signal of the engine rotation speed sensor 26 using an LPF 120 (cutoff frequency: 2 Hz).

In step ST2, it is decided whether or not a count value of a counter ecneleg is 13 (200 ms) or higher, and in a case wherein a decision result thereof is a negative judgment, the procedure proceeds to step ST11.

In step ST11, a unit-time accumulation value enelegh is calculated with the following formula and using the high-frequency component enesmh extracted in step ST1.

enelegh←enelegh+|enesmh−Previous enesmh|

Furthermore, a unit-time accumulation value enelegl is calculated with the following formula and using the low-frequency component enesml extracted in step ST1.

enelegl←enelegl+|enesml−Previous enesml|

When the above-mentioned accumulation process of step ST11 is completed, an increment of the counter ecneleg (ecneleg←ecneleg+1) is performed (step ST12).

Figure 6:
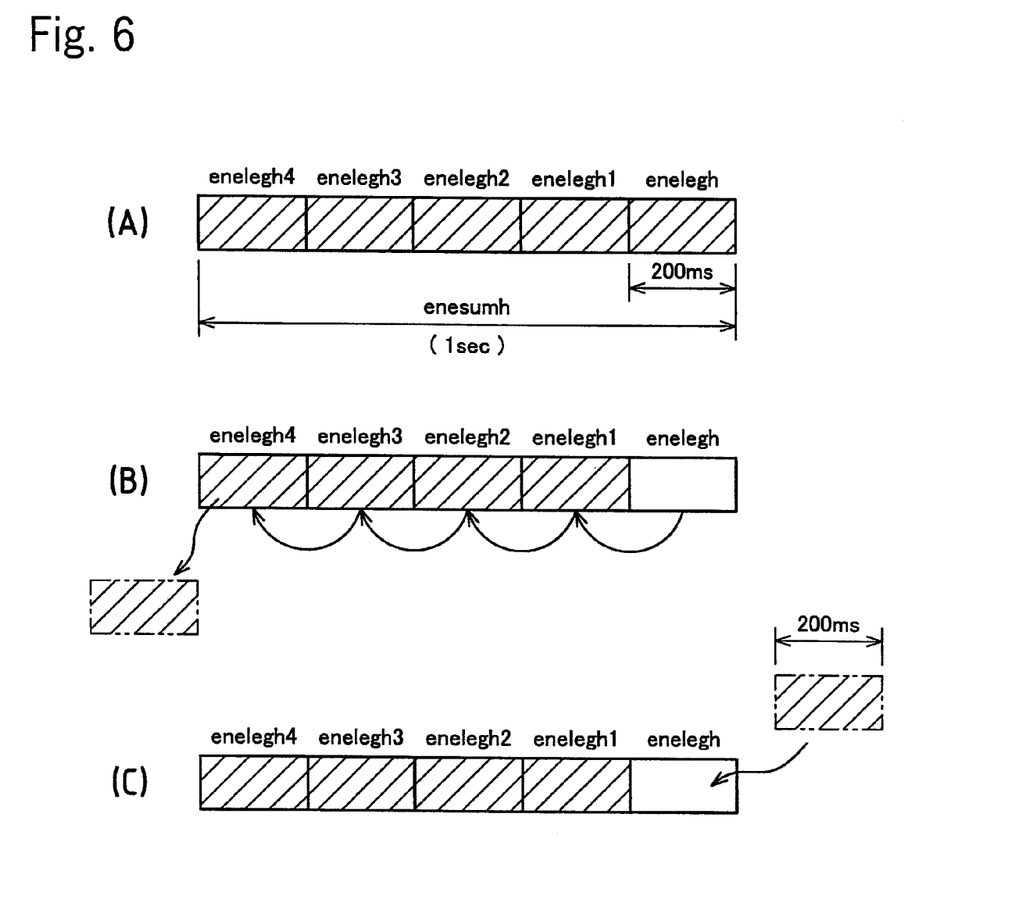
FIG. 6 is an explanatory diagram of a calculation process of a locus length accumulation value.
Figure 7:
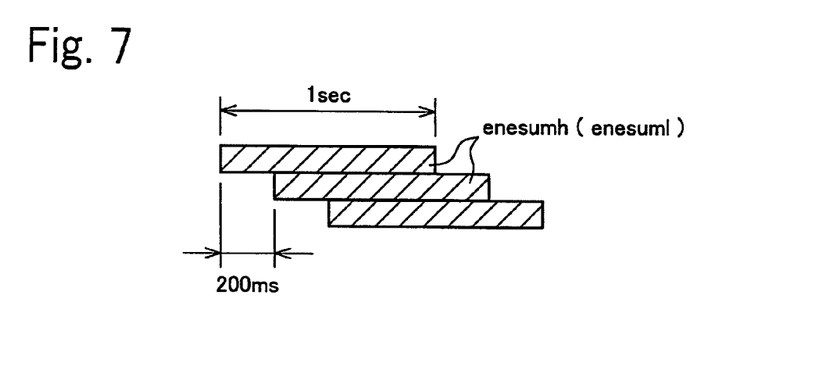
FIG. 7 is an explanatory diagram of a calculation process of a locus length accumulation value.

Here, in this example, the accumulation interval of a locus length accumulation value enesumh of the high-frequency component used in half-clutch decision is set to 1 sec, as shown in FIG. 6 and FIG. 7. However, instead of performing half-clutch decision each time the accumulation interval (1 sec) elapses, the accumulation interval (1 sec) is split into five unit periods (200 ms), and half-clutch decision is performed by sequentially updating the locus length accumulation value enesumh of the high-frequency component using the unit-time accumulation value enelegh accumulated in that unit period (200 ms). Furthermore, similarly, with regard to the low-frequency component side, half-clutch decision is performed by sequentially updating the locus length accumulation value enesuml of the low-frequency component using the unit-time accumulation value enelegl accumulated in the unit period (200 ms).

Accordingly, in this example, execution of the processes of steps ST1, ST11 and ST12 is repeated sequentially until the count value of the counter ecneleg is counted up from 0 and the count value becomes 13 (200 ms) or higher.

Then, when the count value of the counter ecneleg becomes 13 (200 ms) or higher, or in other words, when the decision result of step ST2 becomes a positive judgment, the procedure proceeds to step ST3.

In step ST3, the locus length accumulation value enesumh of the high-frequency component is decided from the unit-time accumulation value enelegh accumulated this time, a unit-time accumulation value enelegh1 of one time therebefore, a unit-time accumulation value enelegh2 of two times therebefore, an enelegh3 of three times therebefore, and a unit-time accumulation value enelegh4 of four times therebefore (enesumh←enelegh+enelegh1+enelegh2+enelegh3+enelegh4).

Furthermore, the locus length accumulation value enesuml of the low-frequency component is decided from the unit-time accumulation value enelegl accumulated this time, a unit-time accumulation value enelegl1 calculated one time therebefore, a unit-time accumulation value enelegl2 calculated two times therebefore, a unit-time accumulation value enelegl3 calculated three times therebefore, and a unit-time accumulation value enelegl4 calculated four times therebefore (enesuml←enelegl+enelegl1+enelegl2+enelegl3+enelegl4).

It should be noted that the locus length accumulation value enesumh of the high-frequency component and the locus length accumulation value enesuml of the low-frequency component decided in step ST4 are stored and maintained until the next accumulation of the unit-time accumulation values enelegh, enelegl has completed.

Next, in step ST4, an update process of the unit-time accumulation values enelegh, enelegl is performed. A specific process thereof is explained by way of reference to FIG. 6, taking the high-frequency component side as an example. It should be noted that the process explanation of this FIG. 6 is performed using symbols only.

First of all, from a state of FIG. 6(A), enelegh4 of four times therebefore is removed. Next, as shown in FIG. 6(B), an update process whereby enelegh3 of three times therebefore is set to enelegh4 of four times therebefore (enelegh4←enelegh3), enelegh2 of two times therebefore is set to enelegh3 of three times therebefore (enelegh3←enelegh2), and enelegh1 of one time therebefore is set to enelegh2 of two times therebefore (enelegh2←enelegh1) is carried out, and in addition, an update process whereby enelegh is set to 0 (enelegh←0) is carried out. Then, as shown in FIG. 6(C), at a point in time whereat the next enelegh accumulation has completed, that enelegh is added to determine the locus length accumulation value enesumh of the high-frequency component.

Furthermore, similarly, with regard to the low-frequency component side, an update process whereby [enelegl4←enelegl3, enelegl3←enelegl2, enelegl2←enelegl1, enelegl←0] is carried out.

When the process of step ST4 has completed, the counter ecneleg is cleared (ecneleg←0) (step ST5).

It should be noted that, the processes of the above-described steps ST2 to ST5 and steps ST11 to ST12 are executed in accumulation processing sections 130, 140 as shown in FIG. 3.

Then, in step ST6, the locus length accumulation value enesumh of the high-frequency component and the locus length accumulation value enesuml of the low-frequency component calculated in step ST3 are plotted on the half-clutch decision map shown in FIG. 5, it is decided whether or not that plot point is inside the half-clutch decision region, and in a case wherein the plot point is inside the half-clutch decision region, it is decided that a cause of the drop in the engine rotation speed Ne is clutch partial engagement.

Furthermore, in step ST6, it is decided whether or not a half-clutch decision continued time is within 10 sec, and in a case wherein clutch partial engagement is decided (inside the half-clutch decision region) and the half-clutch decision continued time ecmcl is within 10 sec (a case wherein the decision result of step ST6 is a positive judgment), decision of clutch partial engagement is continued, and 16 ms is added to the half-clutch decision continued time ecmcl (step ST7). It should be noted that, when a vehicle speed is detected by the vehicle speed sensor 29 during half-clutch decision continuation, it is decided that a half-clutch operation has been correctly performed due to a move-off operation, and this control routine is temporarily terminated.

Meanwhile, in a case wherein the point plotted on the half-clutch decision map is outside the half-clutch decision region, it is decided that a cause of the drop in the engine rotation speed Ne is not clutch partial engagement (step ST8). Furthermore, in a case wherein the half-clutch decision continued time ecmcl exceeds 10 sec, even if the decision result of step ST6 is a half-clutch decision, the half-clutch decision is withdrawn and the half-clutch decision continued time ecmcl is set to "0" (step ST8).

It should be noted that, in a case wherein the half-clutch decision continued time ecmcl exceeds 10 sec, it is decided that the engine rotation speed Ne dropped due to a cause other than clutch partial engagement. Here, the half-clutch decision continued time ecmcl is not limited to 10 sec and may be a sufficiently long period of time generally difficult to envisage in a driving operation. The above-described steps ST6 to ST8 are executed in a judgment processing section 150 of FIG. 3.

With the half-clutch decision process of this example, as explained above, it is decided whether or not the clutch 300 is in a half-clutch state based on a relationship between the locus length of the high frequency component and the locus length of the low frequency component of the engine rotation speed Ne, and therefore, it is possible to determine a half-clutch state while a vehicle is stopped without using a stroke sensor detecting a stroke of the clutch pedal, etc.

Other Embodiments

Although a half-clutch state of the clutch 300 is decided using a half-clutch decision map in the above example, the present invention is not limited thereto, and the half-clutch state can be decided using a locus length ratio of the locus length of the high frequency component and the locus length of the low frequency component [locus length of high-frequency component/locus length of low-frequency component]. A decision process of this case is explained hereinafter.

Figure 8:
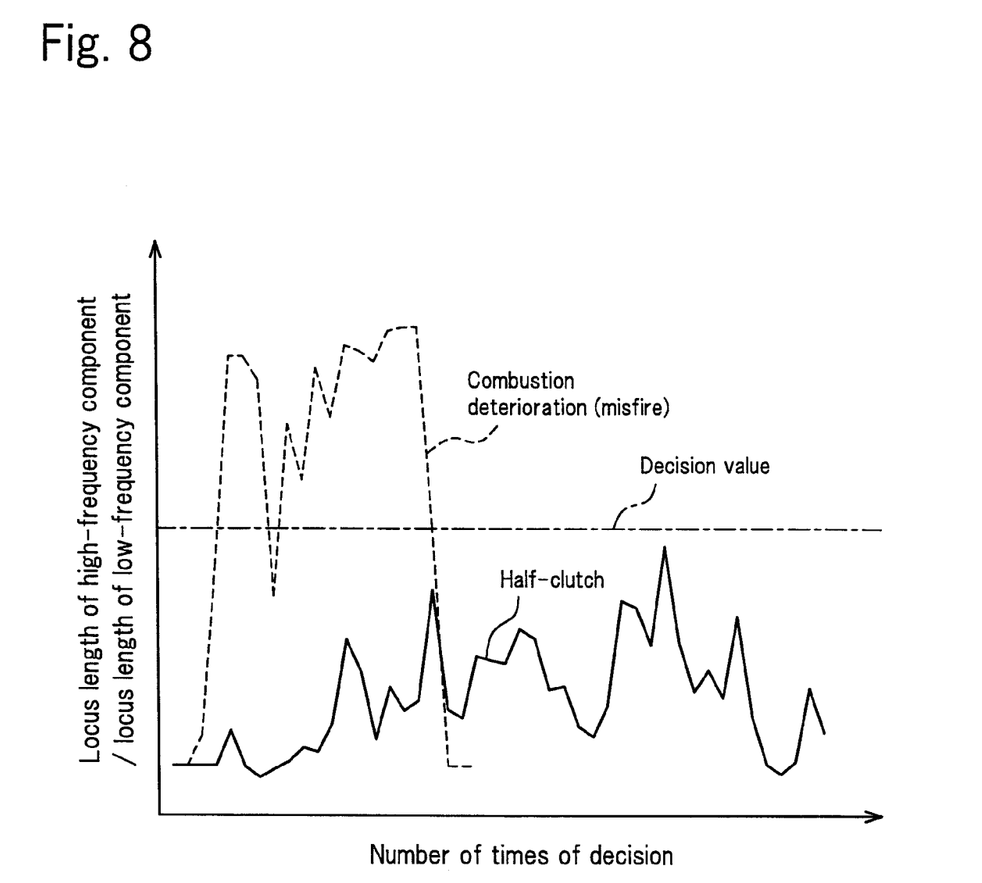
FIG. 8 is a graph used in an example of a case wherein a half-clutch state is detected using a locus length ratio [locus length of high-frequency component/locus length of low-frequency component].

First of all, when a drop occurs in the engine rotation speed Ne, in a case wherein a cause of that drop is a clutch operation of the engine 1, the locus length ratio [locus length of high-frequency component/locus length of low-frequency component] is small, as shown in FIG. 8.

Meanwhile, in a case wherein combustion deterioration (misfire) is a cause of the drop in the engine rotation speed Ne, the high-frequency component becomes stronger in line with a degree of that combustion deterioration. When the high-frequency component becomes stronger, the locus length of the high-frequency component becomes longer, and the locus length ratio [locus length of high-frequency component/locus length of low-frequency component] becomes larger than that when a half-clutch operation is being performed. If, in consideration of this point, a decision value for discriminating between a half-clutch state and a combustion deterioration state is set, a half-clutch state can be decided when equal to or lower than that decision value (locus length of high-frequency component/locus length of low-frequency component≦decision value).

Even in a case wherein half-clutch decision is performed using the locus length ratio in this way, a half-clutch state can be decided by a process similar to that of the flowchart shown in FIG. 4. However, a decision state "inside the half-clutch decision region" of step ST6 of FIG. 4 is changed to "locus length of high-frequency component/locus length of low-frequency component≦decision value".

It should be noted that, with regard to the decision value shown in FIG. 8, setting can be performed by, for example, obtaining the locus length of the high-frequency component and the locus length of low-frequency component using a similar state and method to that for creation of the half-clutch decision map of FIG. 5, and based on that locus length of the high-frequency component and that locus length of low-frequency component, by empirically finding a value allowing discrimination of a half-clutch state and a combustion deterioration state.

Although an example of application of the present invention to an in-cylinder direct injection, four-cylinder gasoline engine was shown in the above example, the present invention is not limited thereto, and application to in-cylinder direct injection gasoline engines of any other number of cylinders, such as, for example, an in-cylinder direct injection, six-cylinder gasoline engine, etc. is possible. Furthermore, it is not limited to in-cylinder direct injection gasoline engines, and the present invention can also be applied to port injection type gasoline engines.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

INDUSTRIAL APPLICABILITY

The half-clutch state decision device of the present invention excels in terms of an ability to determine a half-clutch state without causing incorrect detection of an engine abnormality or an inability to detect an engine abnormality and also without using a stroke sensor, etc., even when a vehicle is stopped, and has an advantageous effect in a vehicle wherein a manual transmission connected to an engine output side via a clutch is mounted. In particular, the realization of this half-clutch state decision device in the in-cylinder direct injection type of engine that is in rapidly increasing demand due to the excellence thereof in terms of low fuel consumption, low exhaust-gas emission, and high output, etc., further enhances the usefulness thereof and has an advantageous effect.

The invention claimed is:

1. A half-clutch state decision device deciding a half-clutch state of a clutch in a vehicle wherein a manual transmission is connected to an output side of an engine via the clutch, comprising:
   an engine rotation-speed detection member detecting a rotation speed of the engine,
   a stop detection member detecting stopping of the vehicle,
   a frequency extraction member extracting a high-frequency component and a low-frequency component of the engine rotation speed through a filtering process when the engine rotation speed has dropped while the vehicle is stopped,
   a locus length calculation member calculating a locus length of the high-frequency component and a locus length of the low-frequency component through accumulation of each of the high-frequency component and the low-frequency component, and
   a decision member deciding whether or not the clutch is in a half-clutch state from a relationship between the locus length of the high-frequency component and the locus length of the low-frequency component calculated by the locus length calculation member.

2. The half-clutch state decision device of claim 1, wherein:
   the decision member uses a map having the locus length of the high-frequency component and the locus length of the low-frequency component as parameters and wherein a half-clutch decision region is set with a relationship between that locus length of the high-frequency component and that locus length of the low-frequency component taken into consideration and decides whether or not a half-clutch state exists by referring to the map based on the locus length of the high-frequency component and the locus length of the low-frequency component calculated by the locus length calculation member.

3. The half-clutch state decision device of claim 1, wherein:
   the decision member calculates a locus length ratio [locus length of high-frequency component/locus length of low-frequency component] of the locus length of the high-frequency component and the locus length of the low-frequency component calculated by the locus length calculation member and decides whether or not a half-clutch state exists by comparing that locus length ratio with a prescribed decision value.

* * * * *